United States Patent
Kapadia et al.

(10) Patent No.: US 9,130,836 B2
(45) Date of Patent: Sep. 8, 2015

(54) PROVISONING OF A NEW NODE JOINING AN EXISTING CLUSTER IN A DATA CENTER ENVIRONMENT

(71) Applicants: Shyam Kapadia, Santa Clara, CA (US); Padmanabhan Krishnan, Sunnyvale, CA (US); Vipin Jain, San Jose, CA (US); Srividya S. Vemulakonda, San Jose, CA (US)

(72) Inventors: Shyam Kapadia, Santa Clara, CA (US); Padmanabhan Krishnan, Sunnyvale, CA (US); Vipin Jain, San Jose, CA (US); Srividya S. Vemulakonda, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 78 days.

(21) Appl. No.: 13/758,732

(22) Filed: Feb. 4, 2013

(65) Prior Publication Data

US 2014/0219079 A1 Aug. 7, 2014

(51) Int. Cl.
*H04L 12/28* (2006.01)
*H04L 12/24* (2006.01)
*G06F 15/16* (2006.01)
*G06F 15/17* (2006.01)

(52) U.S. Cl.
CPC ........ *H04L 41/0806* (2013.01); *H04L 41/0886* (2013.01); *G06F 15/16* (2013.01); *G06F 15/17* (2013.01)

(58) Field of Classification Search
CPC ................................ G06F 15/16; G06F 15/17
USPC ......................................... 370/221, 256, 389
See application file for complete search history.

(56) References Cited

U.S. PATENT DOCUMENTS

| 5,555,416 | A | 9/1996 | Owens et al. |
| 6,999,452 | B1 * | 2/2006 | Drummond-Murray et al. ............................ 370/389 |
| 7,111,055 | B2 | 9/2006 | Falkner |
| 7,356,679 | B1 | 4/2008 | Le et al. |
| 7,539,770 | B2 * | 5/2009 | Meier .......................... 709/236 |
| 7,568,107 | B1 | 7/2009 | Rathi et al. |
| 7,787,480 | B1 | 8/2010 | Mehta et al. |
| 8,160,063 | B2 | 4/2012 | Maltz et al. |
| 8,179,809 | B1 | 5/2012 | Eppstein et al. |
| 2003/0126242 | A1 | 7/2003 | Chang |
| 2003/0177208 | A1 | 9/2003 | Harvey |
| 2004/0255050 | A1 * | 12/2004 | Takehiro et al. ............... 709/252 |

(Continued)

FOREIGN PATENT DOCUMENTS

| EP | 1076848 B1 | 7/2002 |
| EP | 2043320 A1 | 4/2009 |

OTHER PUBLICATIONS

U.S. Appl. No. 13/766,458, filed Feb. 13, 2013 entitled "Deployment and Upgrade of Network Devices in a Network Environment," Inventors: Lucien M. Avramov, et al.

(Continued)

*Primary Examiner* — Farah Faroul
(74) *Attorney, Agent, or Firm* — Patent Capital Group

(57) ABSTRACT

A method is provided in one example embodiment and includes identifying for a new node added to a communications network a plurality of existing network nodes respectively connected to one of a plurality of ports of the new node and capable of implementing a particular routing protocol; selecting one of the identified existing network nodes to serve as a designated forwarder ("DF") for the new node; performing a power on auto provisioning ("PoAP") procedure in connection with the new node; and opening the ports of the new node to which the identified existing network nodes are connected.

20 Claims, 7 Drawing Sheets

(56) References Cited

U.S. PATENT DOCUMENTS

| | | | |
|---|---|---|---|
| 2005/0028154 A1 | 2/2005 | Smith et al. | |
| 2005/0083933 A1* | 4/2005 | Fine et al. | 370/390 |
| 2005/0177829 A1 | 8/2005 | Vishwanath | |
| 2005/0198629 A1 | 9/2005 | Vishwanath | |
| 2006/0280179 A1* | 12/2006 | Meier | 370/389 |
| 2007/0118654 A1 | 5/2007 | Jamkhedkar et al. | |
| 2007/0214348 A1 | 9/2007 | Danielsen | |
| 2008/0046708 A1 | 2/2008 | Fitzgerald et al. | |
| 2008/0155245 A1 | 6/2008 | Lipscombe et al. | |
| 2009/0059934 A1* | 3/2009 | Aggarwal et al. | 370/401 |
| 2010/0138526 A1 | 6/2010 | DeHaan et al. | |
| 2010/0180016 A1 | 7/2010 | Bugwadia et al. | |
| 2011/0107074 A1 | 5/2011 | Chan et al. | |
| 2011/0158088 A1 | 6/2011 | Lofstrand et al. | |
| 2011/0246663 A1* | 10/2011 | Melsen et al. | 709/232 |
| 2012/0219004 A1* | 8/2012 | Balus et al. | 370/395.53 |
| 2012/0233348 A1 | 9/2012 | Winters | |
| 2012/0281700 A1 | 11/2012 | Koganti et al. | |
| 2013/0003733 A1 | 1/2013 | Venkatesan et al. | |
| 2013/0007435 A1 | 1/2013 | Bayani | |
| 2013/0124807 A1 | 5/2013 | Nielsen et al. | |
| 2013/0148663 A1* | 6/2013 | Xiong | 370/392 |
| 2013/0201986 A1* | 8/2013 | Sajassi et al. | 370/390 |
| 2013/0205293 A1 | 8/2013 | Levijarvi et al. | |
| 2013/0219161 A1 | 8/2013 | Fontignie et al. | |
| 2013/0232498 A1 | 9/2013 | Mangtani et al. | |
| 2013/0301472 A1* | 11/2013 | Allan | 370/254 |
| 2013/0336164 A1* | 12/2013 | Yang et al. | 370/255 |
| 2013/0346736 A1 | 12/2013 | Cook et al. | |
| 2014/0105029 A1* | 4/2014 | Jain et al. | 370/242 |
| 2014/0219079 A1* | 8/2014 | Kapadia et al. | 370/221 |

OTHER PUBLICATIONS

Cisco Systems, Inc. "Cisco, Nexus 3000 Series NX-OS Release Notes, Release 5.0(3)U3(1)," Feb. 29, 2012, Part Number: OL-26631-01, 16 pages; http://www.cisco.com/en/US/docs/switches/datacenter/nexus3000/sw/release/503_u3_1/n3k_rel_notes_503_u3_1.html.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages; http://www.cisco.com/en/US/docs/switches/datacenter/nexus3000/sw/fundamentals/503_U3_1/b_Nexus_3000_Fundamentals_Guide_Release_503_U3_1_chapter_0111.pdf.

Cisco Systems, Inc., "Cisco IOS Configuration Fundamentals Configuration Guide: *Using Autoinstall and Setup*," Release 12.2, first published Apr. 2001, last updated Sep. 2003, 32 pages; http://www.cisco.com/en/US/docs/ios/12_2/configfun/configuration/guide/fcf002.html.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages. http://www.cisco.com/en/US/docs/switches/datacenter/nexus5000/sw/release/notes/Rel_5_1_3_N2_1/Nexus5000_Release_Notes_5_1_3_N2.html.

USPTO May 15, 2015 Non-Final Office Action from U.S Appl. No. 13/766,458.

\* cited by examiner

PROVISONING OF A NEW NODE JOINING AN EXISTING CLUSTER IN A DATA CENTER ENVIRONMENT

TECHNICAL FIELD

This disclosure relates in general to the field of data center environments and, more particularly, to implementing power on auto-provisioning ("PoAP") of a new node joining an existing FabricPath ("FP")/TRILL cluster in a massively scalable data center ("MSDC") environment.

BACKGROUND

PoAP is a feature that enables a new switch to auto-configure itself on boot-up on a network without the need for explicit configuration by the network administrator. In general, all that is required is that a Dynamic Host Configuration Protocol ("DHCP") server and a Trivial File Transfer Protocol ("TFTP") server be reachable from the new switch that is coming up. In short, the new switch transmits a DHCP request to obtain an IP address that it will use for the subsequent PoAP process. As part of the DHCP response, the new switch also receives information about the IP address of the TFTP server to contact, the boot image to be downloaded to the switch, the startup configuration to be applied to the switch (usually a template), as well as other necessary information. DHCP options such as 66 and 67, for example, are employed for obtaining this information from the DHCP server. PoAP operates on both management and in-band interfaces. The DHCP discover messages from the switch are sent out on all active interfaces. From the received DHCP offers, the switch selects one offer at random for which the DHCP request is sent. The switch then configures the acquired IP address on the selected interface/SVI 1 to continue with the PoAP process.

After the PoAP process completes, the IP address obtained from the DHCP server is released, the switch reboots with the downloaded boot image, and the switch goes about applying the downloaded startup configuration using, for example, Python/Tcl scripting. PoAP, as described above, is supported for a regular layer 2 network. For obvious reasons, PoAP would be beneficial in MSDC environments; however, for a variety of reasons, the method of PoAP described cannot be directly implemented for a new node joining an existing FP/TRILL cluster in MSDC environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
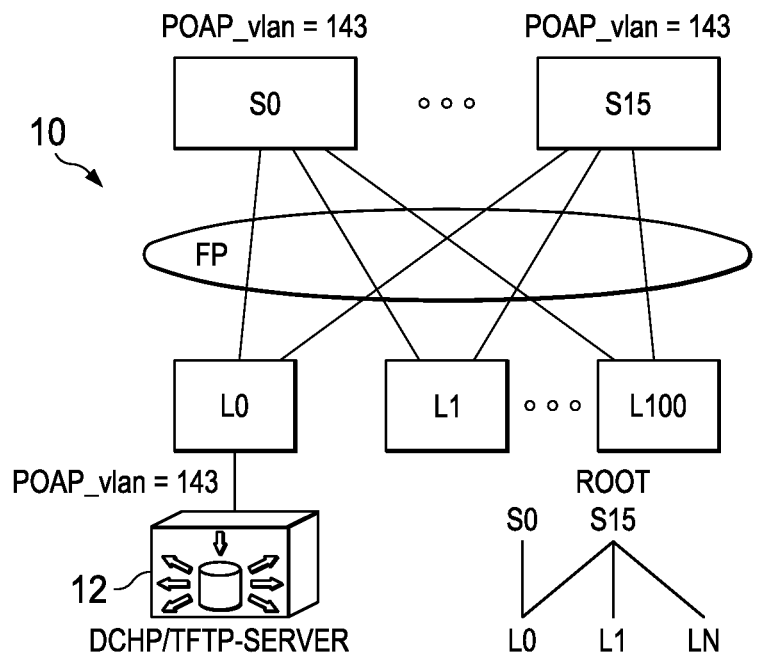
FIG. 1 is a block diagram illustrating an initial state of an example FP network environment in accordance with aspects of one embodiment.

A method is provided in one example embodiment and includes identifying for a new node added to a communications network a plurality of existing network nodes respectively connected to one of a plurality of ports of the new node and capable of implementing a particular routing protocol; selecting one of the identified existing network nodes to serve as a designated forwarder ("DF") for the new node; performing a power on auto provisioning ("PoAP") procedure in connection with the new node; and opening the ports of the new node to which the identified existing network nodes are connected.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As previously noted, a PoAP feature would be extremely beneficial in MSDCs, which are made up of thousands of switches connected in a spine-leaf architecture and may be implemented using an L2 multipath ("L2MP") protocol, such as FabricPath ("FP") or TRILL. Both FP, developed by Cisco Systems, Inc., of San Jose, Calif., and TRILL (Transparent Interconnection of Lots of Links), developed as an IETF standard, perform L2 routing by encapsulating the original frame and adding a new header with new source and destination address information. The new header adds components like a time-to-live ("TTL") field for avoiding infinite loops (like Spanning Tree Protocol ("STP") permits), Equal Cost Multipath ("ECMP") routing to maximize traffic distribution, and Reverse Path Checks ("RPF") for loop avoidance of broadcast and multicast traffic. Additionally, both leverage Intermediate System to Intermediate System ("IS-IS" routing protocol for performing control plane routing.

As used herein, "Vinci" refers to a data center fabric architecture built on a spine-leaf topology that provides optimal connectivity at Layer-2 and Layer-3 between hosts that are connected to leaf switches in the fabric and between hosts and the external network. The control plane, enhanced forwarding semantics, and management techniques provide the framework to support Layer-2 or Layer-3 fabrics. Any suitable encapsulation can be used to transport packets across the fabric where the transit nodes switch only on the fabric overlay header. The Vinci architecture may be implemented on FP or TRILL fabric, with the Layer-2 and Layer-3 traffic being forwarded between the leaf nodes encapsulated in an appropriate FP or TRILL header.

Vinci proposes to employ a Clos-based architecture for data center environments. For ease of deployablity, it is imperative that a new spine switch or a new leaf switch can be transparently brought up via PoAP so that it can join the existing Vinci cluster and become operational. This provides a smooth way of achieving "scale-out" such that as the data center grows, more nodes can be deployed and brought up with minimal hands-on action from the data center administrator.

FIG. 1 is a block diagram illustrating an initial state of an example FP network 10 having a spine-leaf topology in accordance with aspects of one embodiment. The network 10 includes a number of leaf nodes, represented in FIG. 1 by leaf nodes L0-L100, and a number of spine nodes, represented in FIG. 1 by spine nodes S0-S15. It will be noted that spine node S0 also serves as a route reflector ("RR") for the network 10, since the internal protocol used for host route information between the leaf switches is the internal Border Gateway Protocol ("iBGP"). Generally speaking, an RR is an iBGP router that readvertises routes to other iBGP routers. In operation, clusters of iBGP routers may be created and connected with an RR. An RR may not send every route; rather, it may only send the best paths to its peers. A DHCP/TFTP server 12 is connected to leaf node L0. Spine nodes S0-S15 are connected to the server 12 via PoAP VLAN 143. In accordance with features of embodiments described herein, each of the leaf nodes L0-L100 is connected to each of the spine nodes S0-S15, thereby implementing a spine-leaf topology.

In one embodiment, each of the leaf and spine nodes is a network device comprising a switch. Moreover, although the network 10 will be described herein as being implemented as an FP network, the network may instead be implemented as a TRILL network or any other type of L2MP network, as the relevant aspects described herein are equally applicable to all such networks comprising a spine-leaf topology. Additionally, although the DHCP server and TFTP server are illustrated and described as residing on the same physical device, it will be recognized that the servers may reside on separate devices without departing from the spirit or negatively impacting the operation of the embodiments described herein. What is necessary is that both servers be accessible by a new node that comes up on the network 10, as will be described in detail below.

In general, when a new node, or switch, is brought up, it is not yet part of the FP network; that is, it is not FP-capable. This situation is similar to the case of a host connecting to an FP or TRILL network through multiple links via edge ports. The following discussion assumes that the new node is a leaf node; however, the same teachings will apply with respect to any type of node (e.g., a spine node) being brought up in the network. As previously noted, embodiments may be described herein with reference to an FP network; however, it will be recognized that the teachings herein are equally applicable to any L2MP network, including TRILL.

Figure 2:
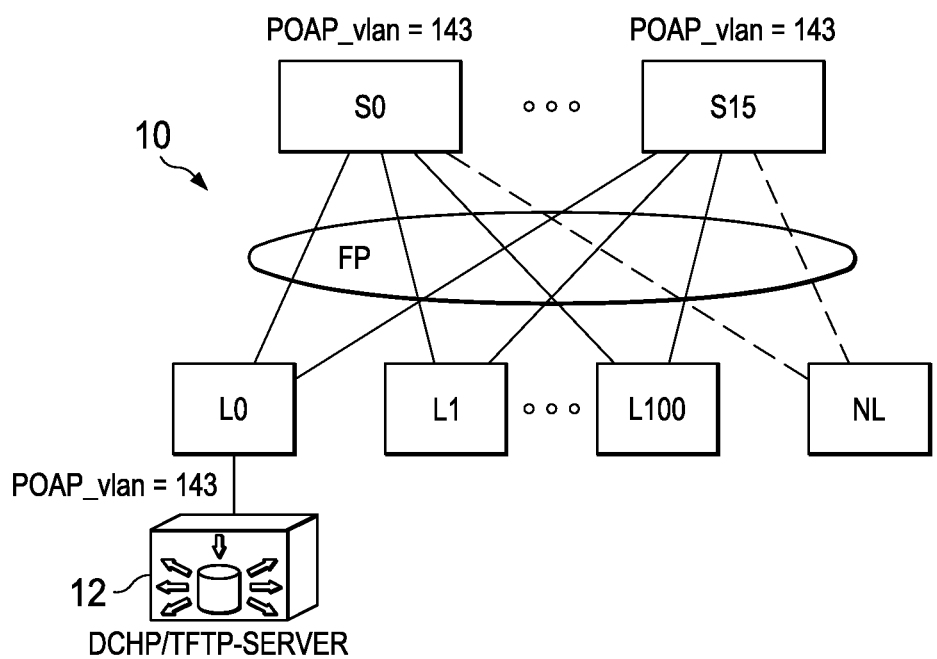
FIG. 2 is a block diagram illustrating a state of an example FP network environment upon power up of a new node therein in accordance with aspects of one embodiment.

As shown in FIG. 2, a new leaf node, designated NL, has come up on the network 10. In accordance with Clos-based network topology, the new leaf node NL is physically connected to each of the spine nodes S0-S15 of the network 10 comprising an existing FP network. Prior to configuration of the new leaf node NL as an FP node, the node NL may receive duplicate packets. For example, if the new leaf node NL were to broadcast a DHCP request in connection with PoAP at this point, the broadcast frames would be received on all of the spine switches S0-S15, which would inject them into the FP network. The frames would traverse one of the multi-destination trees and be received by every switch in the FP network. All of the spine switches (except the spine switch to which the packet was originally sent) would decapsulate the packet and send it to the new leaf node; as a result, the new leaf node would ultimately receive N*(N−1) copies of every broadcast packet, where N is the number of spine switches in the FP network or Vinci cluster, including ones that it originates. To give an example of how burdensome this could be, consider a cluster with 16 spine switches. In this case, every broadcast packet will be received by the new leaf 16*(16−1) or 240 times. Clearly this is inefficient and unacceptable.

This situation may occur not only for broadcast packets, but for unicast responses as well. For example, consider a case in which a leaf switch needs to encapsulate a unicast response for the new leaf NL but does not have a MAC entry in its L2 table (an unusual, but possible, situation that will be referred to herein as a "destination miss"). The leaf switch will multicast the unicast response out on the FP network, or distribution tree, and every spine will receive the packet, decapsulate it, and send it to the new leaf. For cases like an image download, this creates serious overhead and can negatively impact the operability of the entire network.

In order to avoid scenarios such as those described above, the embodiments described herein ensure that there is only a single point of entry from the new node to the FP network until the PoAP process has completed and the new node is rebooted as a FP-capable node. This may be achieved as described in detail below. In one embodiment, the new node effectively behaves as a "host." The existing FP cluster initially treats the FP port toward the new leaf as an edge port; after the PoAP process completes, ports toward the new leaf are treated as core ports.

Figure 3:
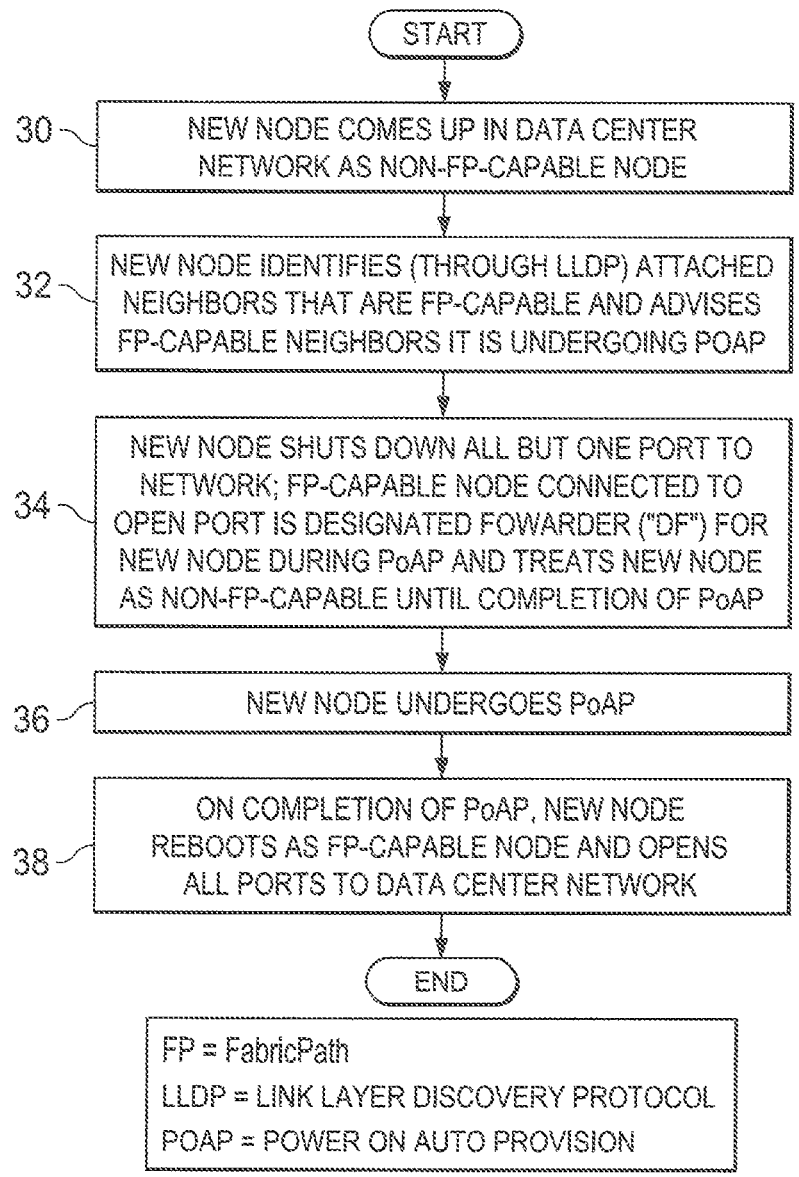
FIG. 3 is a flowchart illustrating operation of a method for enabling PoAP of a new node added to an FP network environment in accordance with aspects of one embodiment.

Referring to FIG. 3, illustrated therein is a flowchart of a method for enabling PoAP for a new node joining an FP network, such as the network 10, in accordance with aspects of one embodiment. As shown in FIG. 3, in step 30, a new node comes up on an existing FP network as a non-FP-capable node. In step 32, the new node identifies ports connected to FP-capable peer nodes (i.e., spines) via LLDP. In step 34, the new node selects a single peer node to serve as a designated forwarder ("DF") for the new node during PoAP and shuts down all other ports. This prevents the new node from receiving duplicate packets, including broadcast packets originated from the new node (e.g., ARP REQ, DHCP REQ), broadcast packets originated from other leafs (e.g., broadcast DHCP Resp), and regular unicast packets with a destination miss, as previously discussed. The DF learns that the new node is in PoAP mode using LLDP and triggers a message for the forwarding process to treat the port as an edge port (for example, using L2MP_CORE_BIT). It should be noted that the edge port status is lost once the port goes down; post PoAP, the port is reprogrammed as a core port. In one embodiment, the peer node passes PoAP VLAN, which is configured by the customer on all spine and leaf nodes, to be used for communication from the new node. In another embodiment, a reserved VLAN ("RSVD VLAN") is employed for the PoAP process for bring-up with an FP network. A DHCP server is accessible via PoAP/RSVD VLAN, which is an FP VLAN for transportation across the FP network.

In step 36, the new node undergoes PoAP, which is implemented through interaction with the DHCP server and TFTP server as described below with reference to FIGS. 5-10. In step 38, after completion of PoAP, the new node reboots as an FP-capable node and opens all ports to the data center network. As previously noted, the port connected to the spine node that previously served as the DF is reprogrammed as a core port.

Figure 4:
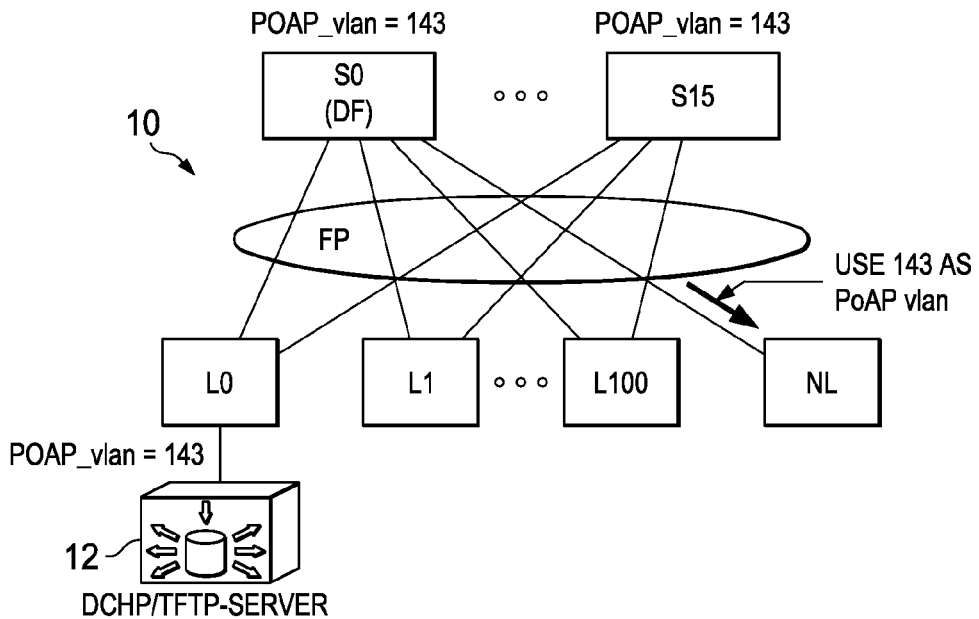
FIG. 4 is a block diagram illustrating a state of an example FP network environment during PoAP of a new node thereof in accordance with aspects of one embodiment.

FIG. 4 illustrates the network 10 after the new leaf NL has selected spine node SO to serve as its DF. In one embodiment, selection of a DF is made at random. In another embodiment, selection of the DF is made by selecting the first port identified as being connected to an FP-capable neighbor of the new node. In yet another embodiment, the DF is selected by identifying the node that is the DF for the fewest number of nodes (which information would be communicated through LLDP). It will be recognized that other means for selecting a DF may be employed without departing from the spirit of the embodiments described herein. As previously described, once the new leaf NL selects a DF, it shuts down all of the ports except for the one connected to the DF, as clearly illustrated in FIG. 4. As also shown in FIG. 4, VLAN 143 is designated for use as the PoAP VLAN.

Figure 5:
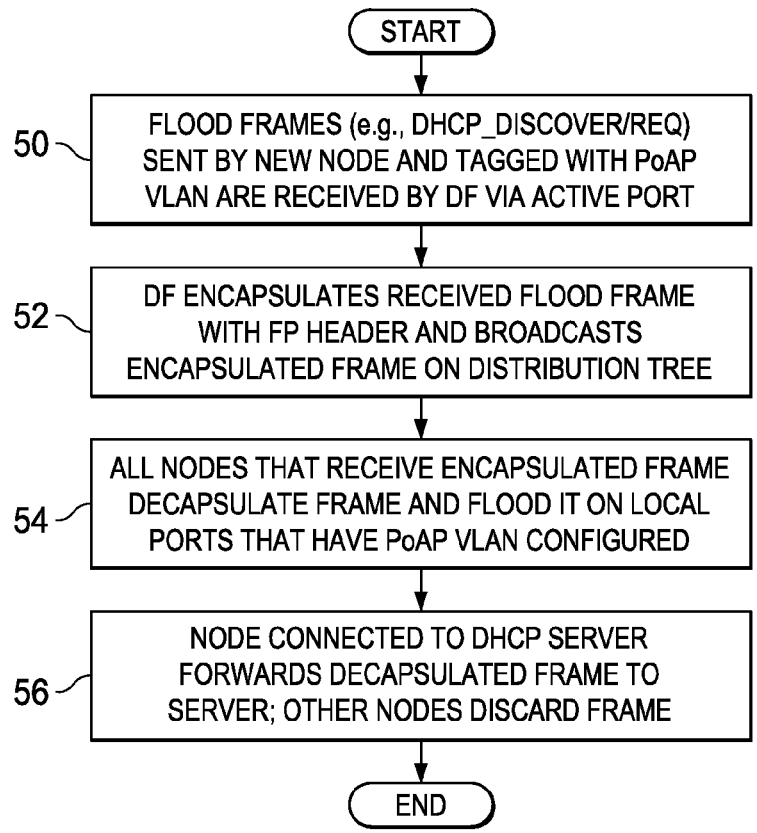
FIGS. 5 and 6 illustrate a method of forwarding a flood frame from a new node in an example FP network environment to a DCHP server in accordance with aspects of one embodiment.

FIG. 5 is a flowchart illustrating a method of forwarding a flood frame from a new node, such as NL, in an FP network, such as network 10, to a DCHP server, such as server 12, in accordance with aspects of one embodiment. In step 50, a flood frame, such as a DHCP_DISCOVER/REQ, sent by the new node and tagged with the PoAP VLAN (VLAN 143) is received by the DF via the active port. In step 52, the DF encapsulates the received frame with an appropriate header, such as a Data Center Ethernet ("DCE") or FP header, and then broadcasts the encapsulated frame on the distribution tree. In step 54, all nodes that receive the encapsulated frame (i.e., all nodes in the distribution tree) decapsulate the frame and flood it onto local ports that have PoAP VLAN configured. In step 56, the node connected to the DHCP server forwards the decapuslated frame to the server. Other nodes discard the frame.

Figure 6:
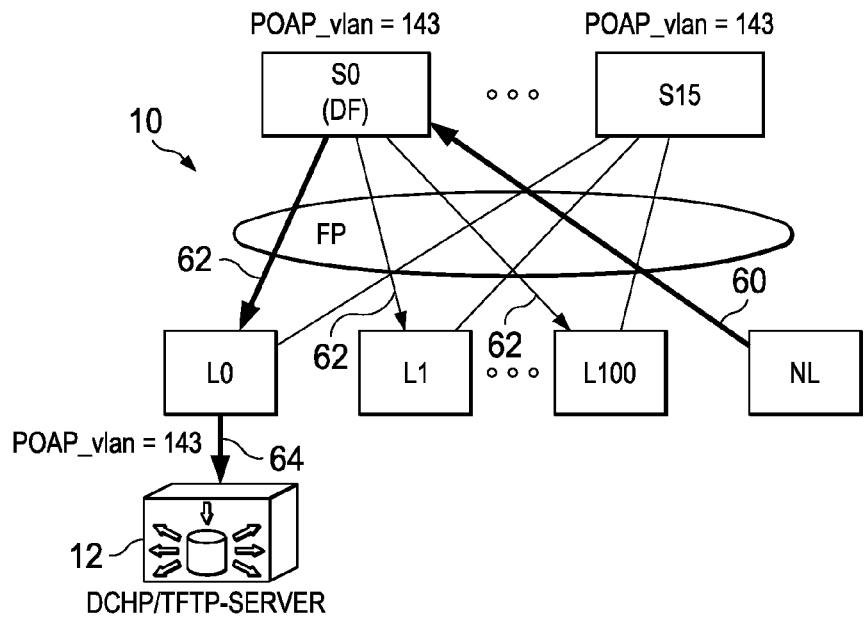

FIG. 6 is a flow diagram further illustrating the method of FIG. 5 as applied to the network 10. As shown in FIG. 6, the new leaf NL broadcasts a DHCP_DISCOVER/REQ message tagged with PoAP VLAN (in this case, 143). The message is received only by spine node S0, as all other ports of new leaf NL are closed, as indicated by an arrow 60. The spine node S0 encapsulates the frame with an appropriate header and sends it toward the distribution tree, as indicated by arrows 62. All nodes forward the received encapsulated frame in accordance with the selected distribution tree, after applying the necessary pruning, receive the DCE frame, decapsulate it, and flood it out on local ports that have the designated PoAP VLAN configured. The leaf connected to the DHCP server 12 (in this case, leaf node L0) forwards it to the server, as indicated by an arrow 64. In summary, as shown in FIG. 6, the path of DHCP_DISCOVER/REQ is:

NL=>S0=>L0=>DHCP server 12

Figure 7:
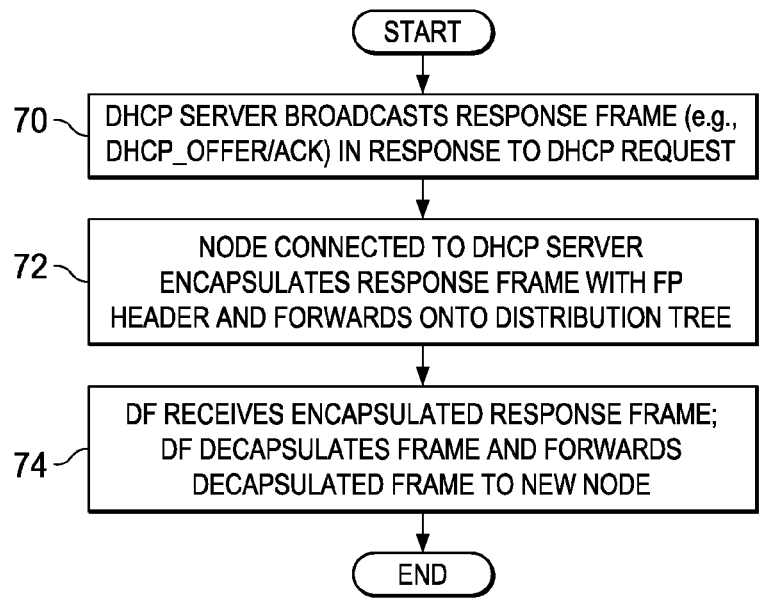
FIGS. 7 and 8 illustrate a method of forwarding a response frame from a DHCP server to a new node of an example FP network environment in accordance with aspects of one embodiment.

FIG. 7 illustrates the flow of a DHCP response to the received DHCP_DISCOVER/REQ message. In step 70, the DHCP server broadcasts a response frame, such as a DHCP_OFFER/ACK, in response to the received DHCP request frame. In step 72, the node connected to the DHCP server encapsulates the response frame with an appropriate header and forwards the encapsulated frame onto the distribution tree. In step 74, the DF receives the encapsulated response frame, decapsulates the frame, and forwards the decapsulated frame to the new node.

Figure 8:
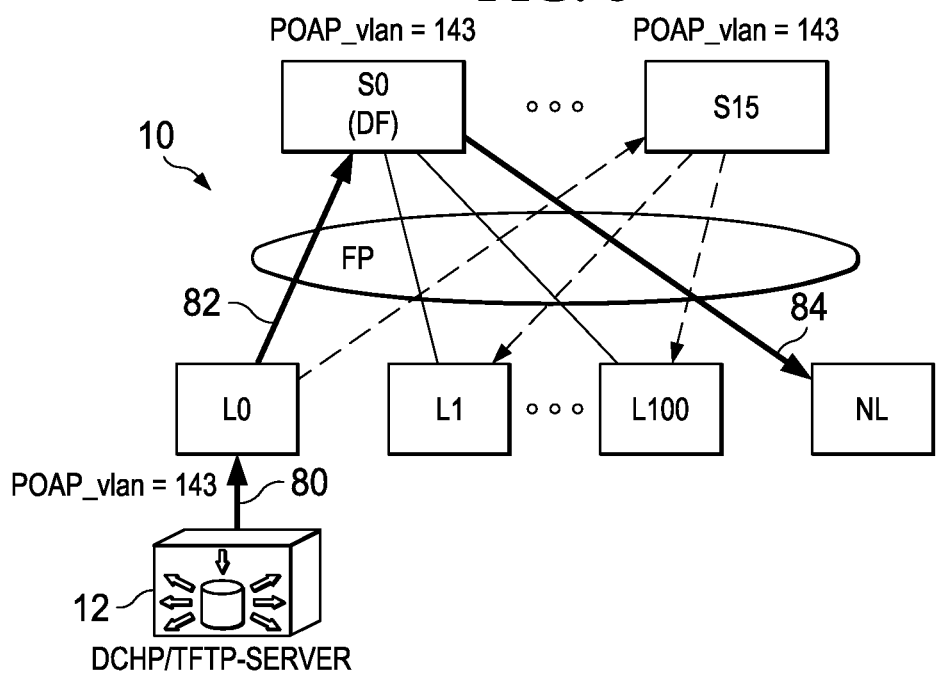

FIG. 8 is a flow diagram further illustrating the method of FIG. 7 as applied to the network 10. As shown in FIG. 8, the DHCP server 12 sends a DHCP_OFFER/ACK reply, as represented by an arrow 80. The leaf connected to the server 12 (in this case, leaf L0) performs the appropriate encapsulation, selects the associated distribution tree, and sends the encapsulated packet onto the associated distribution tree, as represented by an arrow 82. All nodes of the distribution tree receive the broadcast frame. The spine node/DF connected to the new leaf node NL (in this case, spine node S0) sends the original DHCP response toward the new leaf node NL after decapsulating it, as represented by an arrow 84. As previously noted, the spine node S0 treats the port as an edge port. Additionally, as the new leaf node NL has put all other ports toward the spines in a "closed" state, the new leaf node will not receive duplicate responses from other spine nodes (e.g., spine nodes S1-S15). In summary, as illustrated in FIG. 8, the path of DHCP_OFFER/ACK is:

DHCP server 12=>L0=>S0=>NL.

Figure 9:
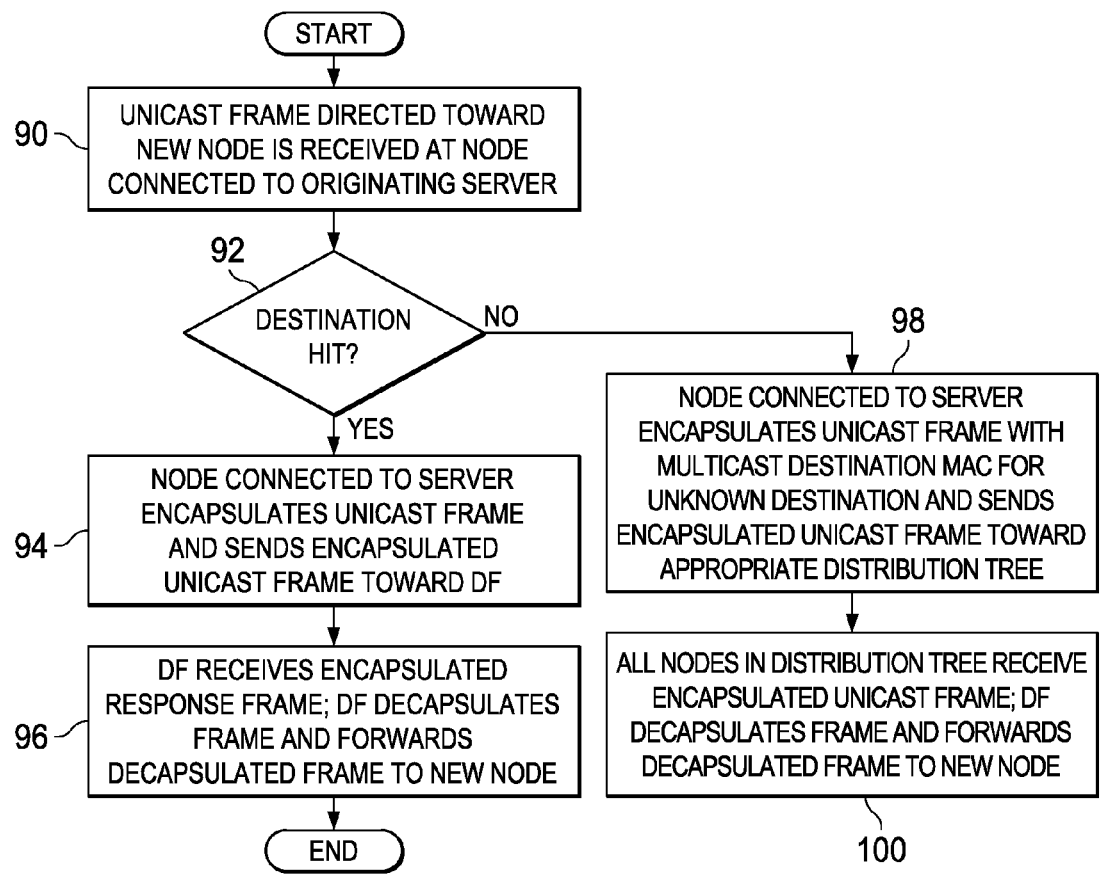
FIGS. 9 and 10 illustrate a method of forwarding a unicast frame from a server to a new node in an example FP network environment in accordance with aspects of one embodiment.

The case of unicast traffic, such as ARP/DHCP unicast response or layer2 unicast data traffic, directed toward the new leaf node NL, must also be considered and addressed. In the case of a destination hit, the leaf that receives the unicast packet will have the MAC entry in its L2 table, as learned against the spine node that performed the encapsulation. The leaf node will send the unicast frame toward the spine node (DST SWID=spine) and the spine node will perform the decapsulation and send the packets toward the new leaf node NL. This situation is illustrated in FIG. 9. In step 90, a unicast frame from a DHCP or TFTP server directed toward the new node is received at the node connected to the originating server. In step 92, a determination is made whether there is a destination hit, meaning that the MAC address of the new node has been learned against the DFs switch ID, execution proceeds to step 94, in which the node connected to the originating server encapsulates the unicast frame and sends the encapsulated frame toward the DF. In step 96, the DF receives the encapsulated frame, decapsulates it, and forwards the decapsulated response to the new node.

If in step 92 it is determined that a destination miss has occurred, execution proceeds to step 98, in which the node connected to the originating server encapsulates the unicast frame with the multicast destination MAC for unknown destinations and sends the encapsulated unicast frame toward the appropriate distribution tree. In step 100, all nodes in the distribution tree, including the DF, receive the encapsulated unicast frame. The DF decapsulates the frame and forwards the decapsulated frame to the new node.

Figure 10:
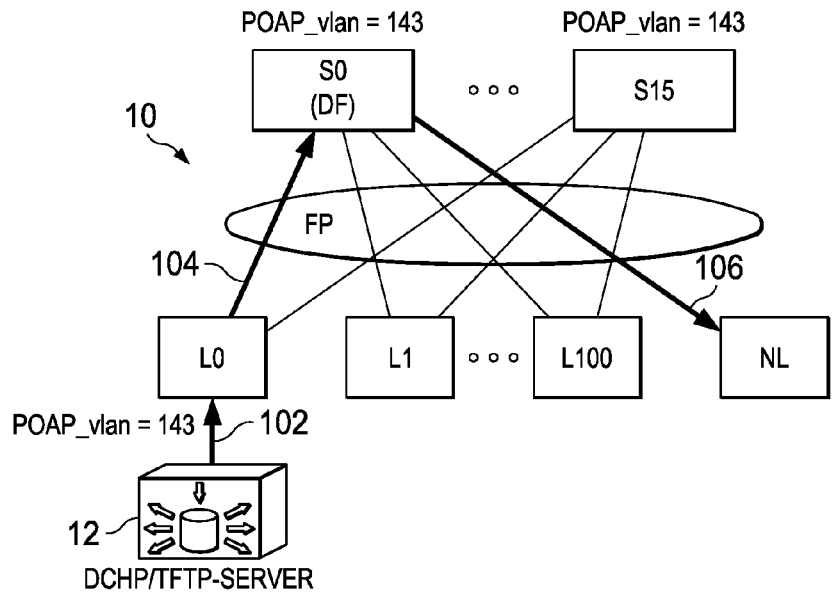

FIG. 10 is a flow diagram further illustrating the method of FIG. 5 as applied to the network 11. In the illustrated example, because a destination hit has occurred, the response message doesn't travel the flood tree. Instead, the message generated by the TFTP server 12 is sent to the leaf node L0, as represented by an arrow 102, which performs appropriate encapsulation thereon and transmits it to the spine node S0, as represented by an arrow 104. The spine node S0 performs FP decapsulation and forwards the response message to new leaf node NL, as represented by an arrow 106. In summary, the path of an ARP response in the case of a destination hit is:

TFTP server 12=>L0(FP encapsulation)=>S0(FP decapsulation)=>NL

The case of a destination miss is handled similarly to the broadcast case described above with reference to FIGS. 7 and 8. In particular, leaf nodes that receive the packet will add the multicast DST MAC (for unknown destination) and forward the packet along the appropriate tree. All nodes will eventually receive the frame. The spine node that serves as the DF will perform decapsulation and forward the packet toward the new leaf node NL.

In general, operation of an example embodiment may be described as follows. A new node that comes up on the network discovers through LLDP the attached neighbors that are FP-capable. The new node shuts down all but one port to the FP network. As previously noted, selection of the port that is not shut down may be accomplished through any number of selection methods and may be as simple as selecting the first node that was identified as being FP-capable or more complex, as would be the case with selecting the node that is the DF for the least number of other nodes (a fact that must also be communicated through LLDP). In any case, what is important in selecting a DF is that only one port connected to an FP-capable neighbor node remains open. The node in the fabric that has its link up with the new node will implicitly perform as a DF for the new node that is coming up on the network. It will be noted, however, that even though the phrase "Designated Forwarder" is used to describe the fabric node, this fact is transparent to the fabric node and the fabric node does not need to perform any special operations to function as the DF in this context. For the flood frames like DHCP REQ, ARP REQ sent by the new node, the frames will be received by only one node in the fabric (i.e., the DF), since the other links are in a closed state.

Upon receipt of a native frame from the new node, the DF will encapsulate the frame, for example, in an FP header, and send it out on the tree, through which it ultimately reaches the DHCP server. The new node will not receive duplicate packets in this embodiment, since its interfaces to the other nodes in the fabric are in a closed state. The response broadcast packet will also travel the FP tree and only the DF will decapsulate the FP frame and send it to the new node. Again, no duplicates are received by the new node because only one link exists between the node and the fabric (via the DF). A regular unicast response to the new node will be sent to the DF, as the MAC address of the new node would have been learned against the Switch ID of the DF, because the DF performed the encapsulation using its Switch ID. In the case of a unicast response that was a "miss" in the L2 table, the process will proceed in the same manner as the broadcast case described above.

When the new node detects that communications with the DF have failed, for example due to link failure or DF failure, the new node will explicitly shut down this port to which the DF was connected and select an alternative DF, thereby ensuring that it maintains a single point of entry to the fabric at all times. After the PoAP process completes, the new node will begin functioning as a regular FP node, with multiple links to the fabric, and L2MP-ISIS will ensure loop free topology.

Although embodiments described herein have been explained with reference to a certain topologies, it will be recognized that the embodiments are applicable to all Clos-based topologies. In Clos-based environments, such as Vinci and other L2MP topologies, such as fat-tree, it is imperative that a new spine or leaf node can be easily added to an existing data center cluster with minimal network admin involvement. Extending PoAP to operate in a FP/TRILL network provides huge advantage with regard to facilitating manageability of the network. The embodiments described herein are fully backward compatible with current PoAP operation in case a switch needs to be brought up as part of a regular (i.e., non-FP/non-TRILL) L2 network. Additionally, the embodiments described herein do not affect any currently active flows traversing the data center network. If at any point during the PoAP process, the new node detects that the link to the DF has gone down for any reason, the node will explicitly shut down that port and select another DF, again ensuring a single point of entry to the network. As has been previously mentioned, the case of a new spine node coming up onto the network is handled in the same manner as the case in which a new leaf node comes up, as described in detail above.

It should be noted that much of the infrastructure discussed herein can be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the activities discussed herein. This could include the implementation of instances of any of the components, engines, logic, modules, etc., shown in the FIGURES. Additionally, each of these devices can have an internal structure (e.g., a processor, a memory element, etc.) to facilitate some of the operations described herein. In other embodiments, the activities may be executed externally to these devices, or included in some other device to achieve the intended functionality. Alternatively, these devices may include software (or reciprocating software) that can coordinate with other elements in order to perform the activities described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Figure 11:
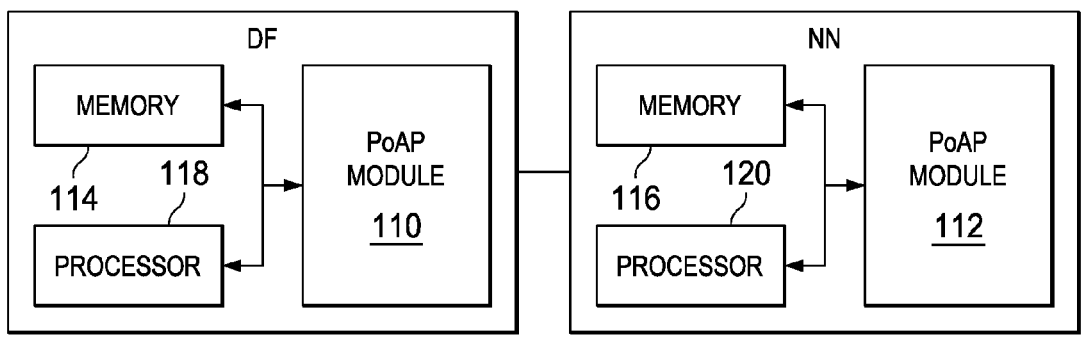
FIG. 11 is a block diagram of a new node and a designated forwarder of the new node in an example FP network environment in accordance with one embodiment.

In one example implementation, various nodes involved in implementing the embodiments described herein can include software for achieving the described functions. For example, referring to FIG. 11, a new node NN and its designated forwarder DF (selected as described in detail above) include PoAP modules 110, 112, respectively, which comprise software embodied in one or more tangible media for facilitate the activities described herein. New node NN and designated forwarder DF may also include memory elements 114, 116, respectively, for storing information to be used in achieving the functions as outlined herein. Additionally, new node NN and designated forwarder DF each may include a processor 118, 120 that can execute software or an algorithm (such as embodied in modules 110, 112, respectively) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   identifying for a new node added to a communications network a plurality of existing network nodes respectively connected to one of a plurality of ports of the new node and capable of implementing a particular routing protocol;
   selecting one of the identified existing network nodes to serve as a designated forwarder ("DF") for the new node;
   closing all of the ports of the new node except for the port to which the DF is connected;
   performing a power on auto provisioning ("PoAP") procedure in connection with the new node; and
   subsequent to the POAP procedure, opening the closed ports of the new node to which the identified existing network nodes are connected,
   wherein the communications network is arranged in accordance with a spine-leaf topology and the new node comprises a leaf node and each of the existing network nodes comprises a spine node.

2. The method of claim 1, wherein the performing a PoAP procedure further comprises the new node communicating with a server connected to the communications network via the DF.

3. The method of claim 1 further comprising:
   detecting a failure in communication between the new node and the DF;
   selecting a replacement DF for the new node from the remaining ones of the identified existing network nodes; and
   closing a port to which the original DF is connected and opening a port to which the replacement DF is connected.

4. The method of claim 1, wherein the particular routing protocol is Layer2 multipath ("L2MP").

5. The method of claim 4, wherein the particular routing protocol is FabricPath or TRILL.

6. The method of claim 1, wherein the performing a PoAP procedure further comprises:
   encapsulating a Dynamic Host Configuration Protocol ("DHCP") flood frame received from the new node and broadcasting the encapsulated frame on the network in accordance with a selected distribution tree.

7. The method of claim 1, wherein the performing a PoAP procedure further comprises:
   decapsulating a Dynamic Host Configuration Protocol ("DHCP") response frame received from the server in accordance with a selected distribution tree and forwarding the decapsulated frame to the new node.

8. The method of claim 1, wherein the performing a PoAP procedure comprises:
   determining whether a unicast frame received at a network node connected to the server results in a destination hit;
   encapsulating the received unicast frame and sending it to the DF in the case of a destination hit; and
   encapsulating the received unicast frame and broadcasting it in accordance with a selected distribution tree in the case of a destination miss.

9. One or more non-transitory tangible media that includes code for execution and when executed by a processor performs operations comprising:
   identifying for a new node added to a communications network a plurality of existing network nodes respectively connected to one of a plurality of ports of the new node and capable of implementing a particular routing protocol;
   selecting one of the identified existing network nodes to serve as a designated forwarder ("DF") for the new node;
   closing all of the ports of the new node except for the port to which the DF is connected;
   performing a power on auto provisioning ("PoAP") procedure in connection with the new node; and
   subsequent to the POAP procedure, opening the closed ports of the new node to which the identified existing network nodes are connected,
   wherein the communications network is arranged in accordance with a spine-leaf topology and the new node comprises a leaf node and each of the existing network nodes comprises a spine node.

10. The media of claim 9, wherein the performing a PoAP procedure further comprises the new node communicating with a server connected to the communications network via the DF.

11. The media of claim 9 further comprising:
    detecting a failure in communication between the new node and the DF;

selecting a replacement DF for the new node from the remaining ones of the identified existing network nodes; and closing a port to which the original DF is connected and opening a port to which the replacement DF is connected.

12. The media of claim 9, wherein the particular routing protocol is Layer2 multipath ("L2MP").

13. The media of claim 9, wherein the performing a PoAP procedure further comprises:

encapsulating a Dynamic Host Configuration Protocol ("DHCP") flood frame received from the new node and broadcasting the encapsulated frame on the network in accordance with a selected distribution tree.

14. The media of claim 9, wherein the performing a PoAP procedure further comprises:

decapsulating a Dynamic Host Configuration Protocol ("DHCP") response frame received from the server in accordance with a selected distribution tree and forwarding the decapsulated frame to the new node.

15. The media of claim 9, wherein the performing a PoAP procedure comprises:

determining whether a unicast frame received at a network node connected to the server results in a destination hit;

encapsulating the received unicast frame and sending it to the DF in the case of a destination hit; and encapsulating the received unicast frame and broadcasting it in accordance with a selected distribution tree in the case of a destination miss.

16. An apparatus comprising:

a memory element configured to store data;

a processor for executing instructions associated with the data; and at least one power on auto provisioning ("PoAP") module configured to:

identify for a new node added to a communications network a plurality of existing network nodes respectively connected to one of a plurality of ports of the new node and capable of implementing a particular routing protocol;

select one of the identified existing network nodes to serve as a designated forwarder ("DF") for the new node;

close all of the ports of the new node except for the port to which the DF is connected;

perform a power on auto provisioning ("PoAP") procedure in connection with the new node; and subsequent to the POAP procedure, open the closed ports of the new node to which the identified existing network nodes are connected, wherein the communications network is arranged in accordance with a spine-leaf topology and the new node comprises a leaf node and each of the existing network nodes comprises a spine node.

17. The apparatus of claim 16, wherein the performing a PoAP procedure further comprises the new node communicating with a server connected to the communications network via the DF.

18. The apparatus of claim 16 wherein the at least one PoAP module is further configured to:

detect a failure in communication between the new node and the DF;

select a replacement DF for the new node from the remaining ones of the identified existing network nodes; and close a port to which the original DF is connected and opening a port to which the replacement DF is connected.

19. The apparatus of claim 16, wherein the particular routing protocol is Layer2 multipath ("L2MP").

20. The apparatus of claim 16, wherein the performing a PoAP procedure further comprises at least one of:

encapsulating a Dynamic Host Configuration Protocol ("DHCP") flood frame received from the new node and broadcasting the encapsulated frame on the network in accordance with a selected distribution tree; and decapsulating a Dynamic Host Configuration Protocol ("DHCP") response frame received from the server in accordance with a selected distribution tree and forwarding the decapsulated frame to the new node.

* * * * *